US012621827B2

(12) United States Patent
    Sun et al.

(10) Patent No.: US 12,621,827 B2
(45) Date of Patent: May 5, 2026

(54) PUCCH AND CELL GROUPING CAPABILITY FOR NR-CA AND NR-DC

(71) Applicant: Apple Inc., Cupertino, CA (US)

(72) Inventors: Haitong Sun, Cupertino, CA (US); Hong He, San Jose, CA (US); Dawei Zhang, Saratoga, CA (US); Wei Zeng, Saratoga, CA (US); Yushu Zhang, Beijing (CN); Amir Aminzadeh Gohari, Sunnyvale, CA (US); Leilei Song, Sunnyvale, CA (US); Mariam Motamed, Redwood City, CA (US)

(73) Assignee: APPLE INC., Cupertino, CA (US)

( * ) Notice: Subject to any disclaimer, the term of this patent is extended or adjusted under 35 U.S.C. 154(b) by 6 days.

(21) Appl. No.: 17/442,342

(22) PCT Filed: Feb. 9, 2021

(86) PCT No.: PCT/CN2021/076207
     § 371 (c)(1),
     (2) Date: Sep. 23, 2021

(87) PCT Pub. No.: WO2022/151558
     PCT Pub. Date: Jul. 21, 2022

(65) Prior Publication Data
     US 2023/0362919 A1    Nov. 9, 2023

(30) Foreign Application Priority Data
     Jan. 15, 2021    (WO) ................ PCT/CN2021/072046

(51) Int. Cl.
     *H04W 72/1268*    (2023.01)
     *H04L 5/14*        (2006.01)
     *H04W 72/51*       (2023.01)

(52) U.S. Cl.
     CPC ........... *H04W 72/1268* (2013.01); *H04L 5/14* (2013.01); *H04W 72/51* (2023.01)

(58) Field of Classification Search
     CPC ...... H04W 72/1268; H04W 72/51; H04L 5/14
     See application file for complete search history.

(56) References Cited

U.S. PATENT DOCUMENTS

2018/0332430 A1    11/2018  Kumar et al.
2020/0351643 A1*   11/2020  Dhanapal ............. H04B 7/0413

FOREIGN PATENT DOCUMENTS

CN          110603455  A    12/2019
CN          111885673  A    11/2020
WO     WO 2016/026066  A1    2/2016

OTHER PUBLICATIONS

3GPP TSG RAN WG1 Meeting #103-3 R1-2009570 (Year: 2020).*

(Continued)

*Primary Examiner* — Ricky Q Ngo
*Assistant Examiner* — Stephen N Steiner
(74) *Attorney, Agent, or Firm* — Sterne, Kessler, Goldstein & Fox, P.L.L.C.

(57) ABSTRACT

Apparatuses, systems, and methods for providing an enhancement for PUCCH and Cell Grouping Capability for NR-CA and NR-DC. A wireless device may transmit, to a base station, a Physical Uplink Control Channel (PUCCH) capability report comprising at least one of PUCCH grouping capability information and a PUCCH location capability information.

18 Claims, 3 Drawing Sheets

UE 106

BS 102

*601 Transmitting PUCCH capability report*

(56)                References Cited

OTHER PUBLICATIONS

International Search Report and Written Opinion of the International Searching Authority directed to related International Patent Application No. PCT/CN2021/076207, mailed Oct. 18, 2021; 9 pages.

RAN1: LS reply on cell-grouping UE capability for synchronous NR-DC, 3GPP Draft; R1-2009570, 3GPP TSG RAN WG1 Meeting #103-e, E-Meeting, Nov. 2020; 3 pages.

Qualcomm Incorporated, R1-2008614, Discussion on NR Rel-16 UE features, 3GPP TSG RAN WG1 #103-E, 3GPP server publication date (Nov. 1, 2020), 102 pages.

Moderator (NTT Docomo Inc.), R1-2009327, Summary on [103-e-NR-UEFeature-Others-01], 3GPP TSG RAN WG1 #103-E, 3GPP server publication date (Nov. 11, 2020), 61 pages.

Notice of Preliminary Rejection, for Korean Patent Application No. 10-2023-7027569, mailed Sep. 26, 2025, 10 pages including English translation.

* cited by examiner

601 Transmitting PUCCH capability report

PUCCH AND CELL GROUPING CAPABILITY FOR NR-CA AND NR-DC

This application is a U.S. National Phase of International Application No. PCT/CN2021/076207, filed Feb. 9, 2021, which is hereby incorporated by reference in its entirety. This application also claims priority to International Application No. PCT/CN2021/072046, filed Jan. 15, 2021.

FIELD

The present application relates to wireless devices, and more particularly to apparatus, systems, and methods for providing downlink control for multi-TRP transmissions.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments relate to apparatuses, systems, and methods to provide an enhancement for PUCCH and Cell Grouping Capability for NR-CA and NR-DC.

According to the techniques described herein, a wireless device may transmit, to a base station, a Physical Uplink Control Channel (PUCCH) capability report comprising at least one of PUCCH grouping capability information and a PUCCH location capability information, wherein the PUCCH grouping capability information indicates carrier types of bands which are configurable in a same PUCCH group, wherein the bands include at least one normal downlink (DL) band and at least one supplementary downlink (SDL) band, and wherein the PUCCH location capability information indicates carrier types of bands which are configurable to transmit the PUCCH, wherein the bands include at least one normal uplink (UL) band and at least one supplementary uplink (SUL) band.

According to the techniques described herein, a base station may receive, from a wireless device, a Physical Uplink Control Channel (PUCCH) capability report comprising at least one of PUCCH grouping capability information and a PUCCH location capability information, wherein the PUCCH grouping capability information indicates carrier types of bands which are configurable in a same PUCCH group, wherein the bands include at least one normal downlink (DL) band and at least one supplementary downlink (SDL) band, and wherein the PUCCH location capability information indicates carrier types of bands which are configurable to transmit the PUCCH, wherein the bands include at least one normal uplink (UL) band and at least one supplementary uplink (SUL) band.

Thus, the techniques described herein may be used to communicate information on SDL and SUL bands for NR-CA and NR-DC, at least according to some embodiments.

The techniques described herein may be implemented in and/or used with a number of different types of devices, including but not limited to cellular base stations, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
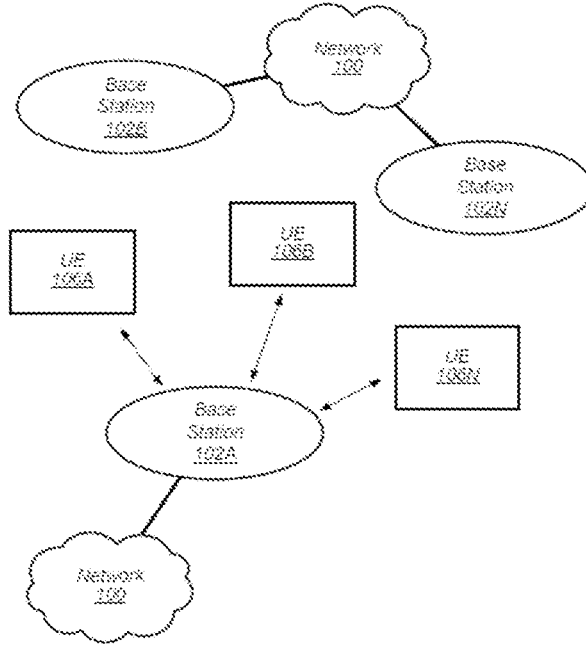
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
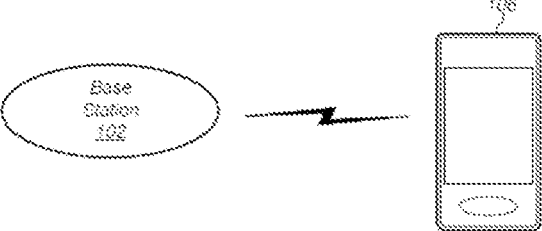
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station).

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Figure 3:
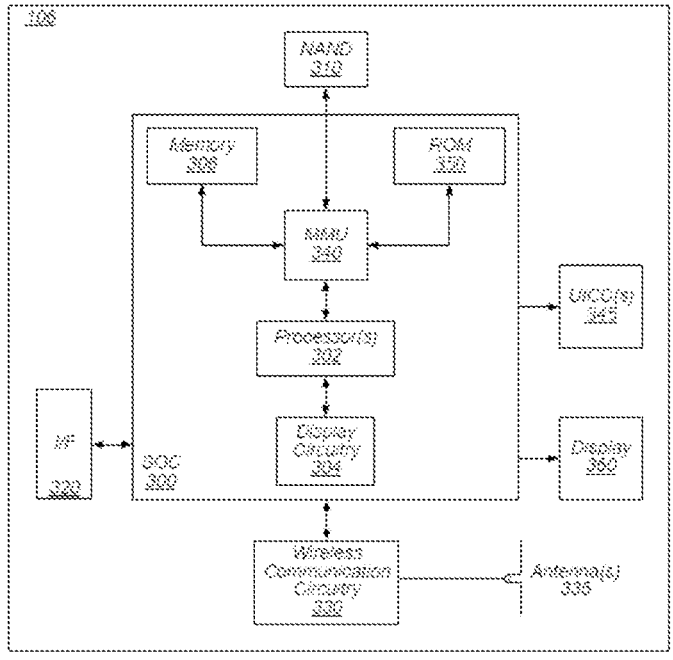
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some embodiments, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Figure 4:
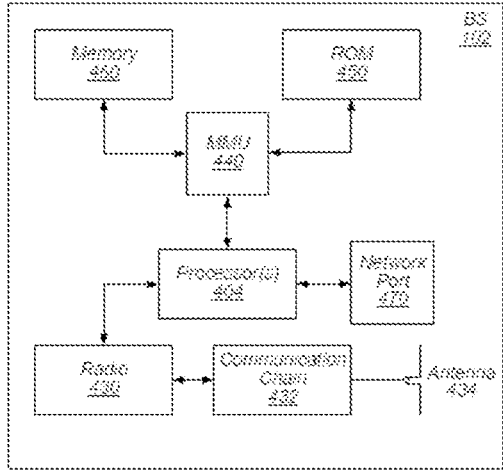
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404.

In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
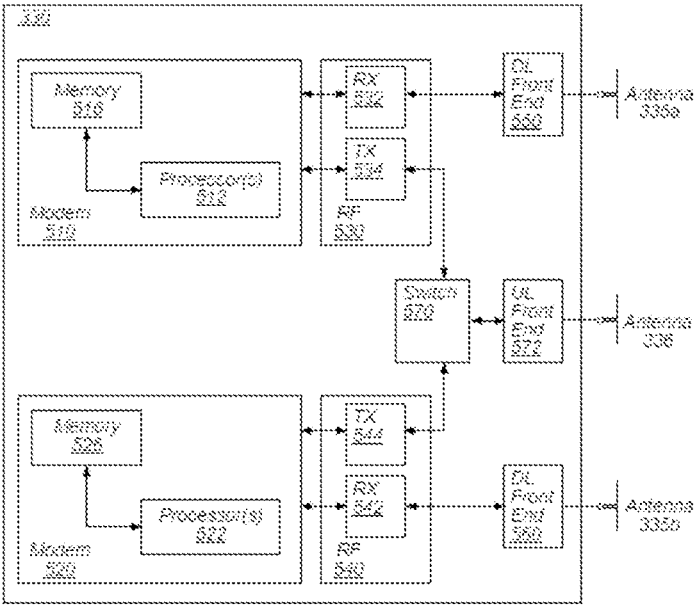
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown. In some embodiments, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 330 may include only one transmit/receive chain. For example, the cellular communication circuitry 330 may not include the modem 520, the RF front end 540, the DL front end 560, and/or the antenna 335*b*. As another example, the cellular communication circuitry 330 may not include the modem 510, the RF front end 530, the DL front end 550, and/or the antenna 335*a*. In some embodiments, the cellular communication circuitry 330 may also not include the switch 570, and the RF front end 530 or the RF front end 540 may be in communication, e.g., directly, with the UL front end 572.

Figure 6:
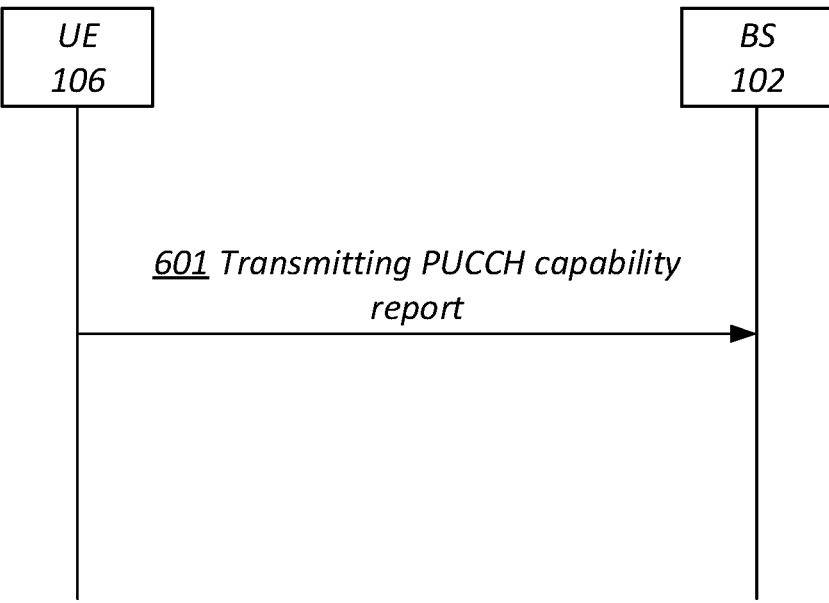
FIG. 6 is a flowchart diagram illustrating an example method for transmitting, by wireless device, a PUCCH capability report to a base station, according to some embodiments.

FIG. 6—Provide an Enhancement for PUCCH and Cell Grouping Capability for NR-CA and NR-DC A Physical Uplink Control Channel (PUCCH) group refers to a group of bands in which the PUCCH may be sent using same resource at the same time. For different 5G architectures including EUTRA-NR Dual Connection (EN-DC), NG-Enb NR Dual Connection (NGEN-DC), NR eNB Dual Connection (NE-DC), NR Carrier Aggregation (NR-CA), and NR Dual Connection (NR-DC), there are different restrictions on PUCCH group configurations (R1-2001306, R1-2001481, also in 38.331, 38.213) as follows:

TABLE 1

| Scenarios | PUCCH Group Limitation |
|---|---|
| EN-DC (NGEN-DC), NE-DC | At most one PUCCH group per frequency range (FR). If two PUCCH groups are configured, one for FR1 and one for FR2. FR2 PUCCH group has to have the same sub-carrier space (SCS). Each PUCCH group has up to 2 different SCS. |
| NR-CA | At most two PUCCHs groups can be configured. No further restrictions on the FR and SCS. Each PUCCH group has up to 2 different SCS. |
| NR-DC | At most one PUCCH group per cell group (CG). Only the same numerology is supported in the cell group with carriers only in FR2. Each PUCCH group has up to 2 different SCS. Note: Rel-15 only allows FR1 + FR2 CG, i.e., one CG in FR1 and one CG in FR2. Note: Rel-16 potentially allows CG with both FR1 and FR2 which becomes a conner case. |

PUCCH group related capability are defined by feature group (FG). There are restrictions on PUCCH group related capability as follows:

TABLE 2

| FG | FG name | Note |
|---|---|---|
| FG6-7 | Two NR PUCCH groups with same numerology. | Support two PUCCH groups. Only same SCS across both PUCCH groups, for all carriers for both data and control. |
| FG6-8 | Different numerologies across NR PUCCH groups. | Support two PUCCH groups. Only different SCS across both PUCCH groups, for all carriers for both data and control. |
| FG6-9 | Different numerologies across NR carriers within the same NR PUCCH group, with PUCCH on a carrier of smaller SCS. | Within a PUCCH group, Support up to 2 different SCS, but PUCCH is using the smaller SCS. |
| FG6-9a | Different numerologies across NR carriers within the same NR PUCCH group, with PUCCH on a carrier of larger SCS. | Within a PUCCH group, Support up to 2 different SCS, but PUCCH is using the larger SCS. |

Current PUCCH group related capability is inadequate in the sense that:

1) It does not allow UE to support single PUCCH group with more than 2 numerologies;

2) It does not allow UE to report the supported PUCCH group configuration, e.g. which band can be configured in the same PUCCH group; and 3) It does not allow UE to report the supported PUCCH location, e.g. in which band, PUCCH can be configured.

To address this issue, in RAN1 #103e, RAN1 agreed to introduce the following three additional FGs for NR-CA:

1) FG22-6: Single PUCCH group with up to three different SCS.

The PUCCH location can be reported with carrier type resolution, i.e., {FR1 licensed TDD, FR1 unlicensed TDD, FR1 licensed FDD, FR2}.

2) FG22-6a: Single PUCCH group with up to four different SCS.

The PUCCH location can be reported with carrier type resolution.

3) FG22-7: PUCCH grouping reporting.

The PUCCH grouping, i.e., which band/carrier can be configured in the same PUCCH group, can be reported with carrier type resolution; and The PUCCH location can be reported with carrier type resolution.

1) Handling of SDL;

2) Handling of SUL;

3) How to count number of bands and different carrier types; and

4) UE capability signaling design.

FIG. 6 is a signal flow diagram illustrating an example of such a method, at least according to some embodiments. Aspects of the method of FIG. 6 may be implemented by a wireless device such as a UE 106 illustrated in various of the Figures herein, a base station such as a BS 102 illustrated in various of the Figures herein, and/or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

As shown in FIG. 6, in step 601, a UE 106 may transmit, to a base station 102, a Physical Uplink Control Channel (PUCCH) capability report comprising at least one of PUCCH grouping capability information and a PUCCH location capability information. The PUCCH grouping capability information may indicate carrier types of bands which are configurable in a same PUCCH group. The bands may include at least one normal downlink (DL) band and zero or one or more supplementary downlink (SDL) band. The PUCCH location capability information may indicate carrier types of bands which are configurable to transmit the PUCCH. The bands may include at least one normal uplink (UL) band and zero or one or more supplementary uplink (SUL) band.

PUCCH Grouping Capability Information/Handing of SDL

The PUCCH grouping capability information may indicate carrier types of bands which are configurable in a same PUCCH group. The PUCCH grouping capability information relates to DL band, including normal DL band and SDL band.

Current Supplemental Downlink (SDL) and Supplemental Uplink (SUL) bands defined in 38.101 (2020-09) are as follows.

TABLE 3

| | | | | | |
|---|---|---|---|---|---|
| Current SDL and SUL band as of 38.101-1 V16.5.0 (2020-09) | | | | | |
| | Band # | xDD | UL frequency Range | DL Frequency Range | Note |
| SDL | n29 | TDD | N/A | 717 MHz-728 MHz | Overlap with band 44 (TDD) |
| | n75 | TDD | N/A | 1432 MHz-1517 MHz | Overlap with band 50 (TDD) Overlap with band 74 (FDD) |
| | n76 | TDD | N/A | 1427 MHz-1432 MHz | Overlap with band 51 (TDD) |
| SUL | n80 | FDD | 1710 MHz-1785 MHz | N/A | Associated with band 41, 77, 78, 79 |
| | n81 | FDD | 880 MHz-915 MHz | N/A | Associated with band 41, 78, 79 |
| | n82 | FDD | 832 MHz-862 MHz | N/A | Associated with band 78 |
| | n83 | | 703 MHz-748 MHz | N/A | Associated with band 78 |
| | n84 | FDD | 1920 MHz-1980 MHz | N/A | Associated with band 77, 78, 79 |
| | n86 | | 1710 MHz-1780 MHz | N/A | Associated with band 78 |
| | n89 | FDD | 824 MHz-849 MHz | N/A | |
| | n95 | TDD | 2010 MHz-2025 MHz | N/A | Associated with band 41, 79 |

As discussed above, there are four existing carrier types, i.e., FR1 licensed Time Division Duplexing (TDD), FR1 unlicensed TDD, FR1 licensed Frequency Division Duplexing (FDD), and FR2. A bitmap including four bits may be used to indicate the configured carrier types, i.e., {FR1 licensed TDD, FR1 unlicensed TDD, FR1 licensed FDD, FR2}. Here, for 5G wireless communication, FR1 covers a frequency range of 450 MHz to 6000 MHz, and FR2 covers a frequency range of 24250 MHz-52600 MHz.

In accordance with a first embodiment, SDL may be introduced as special carrier type for the PUCCH grouping reporting. In other words, the bitmap representing the carrier type may be {FR1 licensed TDD, FR1 unlicensed TDD, FR1 licensed FDD, FR2, SDL}. When UE indicates which bands/CCs can be configured in the same PUCCH group, UE can indicate from the expanded carrier types.

If the bitmap indicates the UE can configure an SDL, then as long as a band is an SDL band, it can be configured in the corresponding PUCCH group.

For example, assume there is a Band Combination (BC) containing 4 bands (B1, B2, B3, B4)·

B1: FR1 licensed TDD
B2: FR1 licensed TDD
B3: FR1 licensed FDD
B4: FR2

For this BC, UE may report the PUCCH grouping capability information as follows:

For primary PUCCH group, {1 0 1 0}
For secondary PUCCH group, {0 0 0 1}
This means that network can configure:
B1, B2 and B3 in the primary PUCCH group,
B4 in the secondary PUCCH group, {0 0 0 1}.

When SDL is introduced as special carrier type for the PUCCH grouping capability information reporting, the bitmap representing the carrier type may include 5 bits. If the bitmap indicates the UE can configure SDL, then as long as a band is an SDL band, it should be treated the same from the UE capability perspective.

In accordance with a second embodiment, for forward compatibility, SDL can be further split in to FR1 SDL and FR2 SDL. In other words, the bitmap representing the carrier type may be {FR1 licensed TDD, FR1 unlicensed TDD, FR1 licensed FDD, FR2, FR1 SDL, FR2 SDL}. When UE indicates which bands/CCs can be configured in the same PUCCH group, UE can indicate from the expanded carrier types. In this case, the bitmap representing the carrier type may include 6 bits. If the bitmap indicates the UE can configure FR1 SDL, then as long as a band is an FR1 SDL band, it should be treated the same from the UE capability perspective.

In accordance with a third embodiment, the SDL band is indicated by a predefined mapping relationship defining the mapping of the SDL band to one of the existing carrier types. For example, if the SDL band is mapped to FR1 licensed TDD band, then if UE indicates that it supports FR1 licensed TDD band, then it implies that UE also supports the corresponding SDL. The mapping relationship, i.e., the duplexing direction (FDD or TDD) of an SDL band is predefined in the related communication specification, for example RAN4 38.101. Only duplexing mode is needed because all the SDL and SUL bands, so far, are in FR1, licensed spectrum, so only difference is FR1 licensed TDD or FR1 licensed FDD. Those skilled in the art would understand that if the SDL or SUL bands may be in other FR in addition to FR1, then the mapping relationship may include the FR information in addition to duplexing direction.

In accordance with a fourth embodiment, the SDL band is indicated by mapping to one of the existing carrier types according to the normal band(s) it overlaps. That is to say, the carrier type (FDD or TDD) of an SDL band depends on the normal band(s) it overlaps. If an SDL band only overlaps with one band, then it follows the duplexing direction of the band it overlaps with. If an SDL band does not overlap with any band, then it is fixed as (1) FDD, or, (2) TDD. If an SDL band overlaps with more than one band, it follows an xDD when all overlapping bands have the same xDD, and it is fixed as (1) FDD, or, (2) TDD when different overlapping bands do not have the same xDD.

PUCCH Location Capability Information/Handing of SUL

The PUCCH location capability information may indicate carrier types of bands which are configurable to transmit the PUCCH. The PUCCH location capability information relates to UL band, including normal UL band and SUL band.

In accordance with a first embodiment, SUL is introduced as special carrier type for the PUCCH location reporting. In other words, the bitmap representing the carrier type may be {FR1 licensed TDD, FR1 unlicensed TDD, FR1 licensed FDD, FR2, SUL}. When UE indicates which bands/CCs can be configured to transmit PUCCH, UE can indicate from the expanded carrier types.

When SUL is introduced as special carrier type for the PUCCH grouping reporting, the bitmap representing the carrier type may include 5 bits. If the bitmap indicates the UE can configure SUL to transmit PUCCH, then as long as a band is an SUL band, it can be configured to transmit PUCCH.

In accordance with a second embodiment, for forward compatibility, SUL can be further split in to FR1 SUL and FR2 SUL. In other words, the bitmap representing the carrier type may be {FR1 licensed TDD, FR1 unlicensed TDD, FR1 licensed FDD, FR2, FR1 SUL, FR2 SUL}. When UE indicates which bands/CCs can be configured to transmit PUCCH, UE can indicate from the expanded carrier types. In this case, the bitmap representing the carrier type may include 6 bits. If the bitmap indicates the UE can configure FR1 SUL to transmit PUCCH, then as long as a band is an FR1 SUL band, it can be configured to transmit PUCCH.

In accordance with a third embodiment, the SUL band is indicated by mapping to one of the existing carrier types. For example, the carrier type (FDD or TDD) of a SUL band follows the normal band it is associated with. The association is defined in RAN4 specification 38.101. If a SUL band is associated with another band X in 38.101, if UE indicates that NW can configure PUCCH transmission in band X, UE also supports the PUCCH transmission in the corresponding SUL band.

In accordance with a fourth embodiment, the SUL band is indicated by mapping to one of the existing carrier types. When the carrier type (FDD or TDD) of a SUL band follows the band it is associated with, UE is allowed to further differentiate the FR1/FR2 and Licensed/Unlicensed. If an FR2 SUL band is associated with FR1 NUL (Normal Uplink) band, or, an FR1 SUL band is associated with FR2 NUL (Normal Uplink) band, UE is allowed to indicate that UE may not support the SUL, for PUCCH location configuration, even if UE indicates that UE support the associated NUL band. If a unlicensed SUL band is associated with licensed NUL (Normal Uplink) band, or, a licensed SUL band is associated with unlicensed NUL (Normal Uplink) band, UE is allowed to indicate that UE may not support the SUL, for PUCCH location configuration, even if UE indicates UE support the associated NUL band.

In some cases, the SUL band may be fixed as an FDD band.

A supplemental band, either SDL or SUL, may be characterized as TDD band. If 3GPP agrees that SDL or SUL band is TDD band, 3GPP might allow TDD pattern to be configured for SDL or SUL band. The TDD pattern will prevent some slots from being used for communication, i.e. for reception in SDL band and for transmission for SUL band, mainly to mitigate the potential interference issue. Thereby, NW can configure the TDD pattern (Downlink, Uplink, Special) for the corresponding SDL or SUL band. In other cases, NW is not allowed to configure the TDD pattern. Thus, all the symbols/slots are UL symbols/slots for SUL band and all the symbols/slots are DL symbols/slots for SDL band.

Counting Number of Bands and Different Carrier Types

The enhancement to the PUCCH grouping/location capability is agreed under the following condition, i.e., two PUCCH groups is reported per Band Combination (BC) for NR-CA with 3 or more bands with at least two carrier types from carrier types {FR1 licensed TDD, FR1 unlicensed TDD, FR1 licensed FDD, FR2}.

There are many different bands defined for NR and LTE, because different operators may own different part of spectrum. For NR deployment, different operators may use different BC, in which a BC contains multiple bands. In other words, operators may deploy NR in multiple bands which are a BC. There are multiple BCs defined in the specification requested by different operators. For each BC, UE can indicate whether UE supports NR deployed in that BC. If UE supports, UE can further report the PUCCH group related UE capability.

As regard to whether and how to count SDL and SUL when counting the number of bands in a BC, the disclosure proposes the following possible solutions which may be adopted:

Solution 1: None of SDL and SUL bands are counted;

Solution 2: Only SDL bands are counted, but SUL bands are not counted;

Solution 3: Only SUL bands are counted, but SDL bands are not counted; or

Solution 4: All of SDL and SUL bands are counted.

As regard to whether and how to count SDL and SUL when counting the different carrier Types, the disclosure proposes the following possible solutions which may be adopted:

Solution 1: None of SDL and SUL bands are counted;

Solution 2: Only SDL bands are counted, but SUL bands are not counted;

Solution 3: Only SUL bands are counted, but SDL bands are not counted; or

Solution 4: All of SDL and SUL bands are counted.

Capability Signaling

The PUCCH grouping capability information or the PUCCH location capability information may indicate the carrier types of bands for a primary PUCCH group and a secondary PUCCH group, respectively. When carrier types are represented as {FR1 licensed TDD, FR1 unlicensed TDD, FR1 licensed FDD, FR2}, for the primary and secondary PUCCH group, UE needs to report which bands/CCs can be configured in the primary or secondary PUCCH group and which band/CC can be configured to transmit PUCCH in the primary or secondary PUCCH group.

For PUCCH grouping capability information, i.e. which bands/CCs can be configured in the same PUCCH group, for each BC, if the SDL is not introduced as a new carrier type, then a 4 bit bitmap is allowed for the primary PUCCH group and the secondary PUCCH group. Each bit is mapped to one of carrier types, {FR1 licensed TDD, FR1 unlicensed TDD, FR1 licensed FDD, FR2}. However, if the SDL is introduced as a new carrier type, then a 5 bit bitmap is allowed for the primary PUCCH group and the secondary PUCCH group. Further, if the SDL is introduced as two new carrier types, then a 6 bit bitmap is allowed for the primary PUCCH group and the secondary PUCCH group.

For example, if the SDL or SUL band is indicated by mapping instead of introducing new carrier type, UE can report 4 different carrier types, for example, Primary PUCCH group: {1, 1, 1, 0}, Secondary PUCCH group: {0, 0, 0, 1}. This is interpreted as, in the corresponding Band Combination (BC), NW can configure any band that belong to either FR1 licensed TDD or FR1 unlicensed TDD or FR1 licensed FDD in the primary PUCCH group, and NW can configure any band that belong to FR2 in the secondary PUCCH group.

If the corresponding BC does not contain all the carrier types, the number of bits in the bitmap can be correspondingly reduced.

Alternatively, for PUCCH grouping capability information, for each BC, UE is allowed to report the index into the list of 4 bits bitmap for indicating carrier types of bands, independently, for Primary PUCCH group and Secondary PUCCH group. This way may reduce overhead when the number of BC is very large.

The same designed principle for PUCCH grouping capability information can be applied to PUCCH location capability information. The location of the PUCCH can be further restricted in the supporting carrier types, for the corresponding PUCCH group.

For example, PUCCH location capability information of {1, 0, 1, 0} means the PUCCH can be configured in either FR1 licensed TDD band or FR1 licensed FDD band. Furthermore, since multiple PUCCH grouping reporting are allowed, multiple PUCCH location reporting are also allowed.

For example, PUCCH capability report including the PUCCH grouping capability information and the PUCCH location capability information may be as follows:

```
{
Primary PUCCH Group
    PUCCH grouping: {1, 0, 1, 0}
    PUCCH location: {1, 0, 0, 0}
Secondary PUCCH Group
    PUCCH grouping: {0, 0, 0, 1}
    PUCCH location: {0, 0, 0, 1}
}
{
Primary PUCCH Group
    PUCCH grouping: {1, 0, 0, 1}
    PUCCH location: {1, 0, 0, 1}
Secondary PUCCH Group
    PUCCH grouping: {0, 0, 1, 0}
    PUCCH location: {0, 0, 1, 0}
}
```

This means that for the BC, UE supports two possible configuration:

Configuration 1
    Primary PUCCH group
        FR1 licensed TDD band and FR1 licensed FDD band can be configured in this PUCCH group,
        PUCCH can be configured in FR1 licensed TDD band.
    Secondary PUCCH group
        FR2 band in this PUCCH group,
        PUCCH can be configured in FR2 band.
Configuration 2
    Primary PUCCH group
        FR1 licensed TDD band and FR2 band can be configured in this PUCCH group,
        PUCCH can be configured in either FR1 licensed TDD band or FR2 band.
    Secondary PUCCH group
        FR1 licensed FDD band in this PUCCH group,
        PUCCH can be configured in FR1 licensed FDD band.

The above describes solutions directed to NR-CA. The same concept may also apply to NR-DC (Dual Connectivity). In NR-DC, there may be two and only two Cell Groups, MCG (Master Cell Group) and SCG (Secondary Cell Group). In each cell group, there may be one and only one PUCCH group.

Therefore, for NR-DC, the PUCCH grouping configuration is the same as cell grouping configuration, so the PUCCH capability reporting designed for NR-CA can be used for cell grouping capability design for NR-DC.

In the following further exemplary embodiments are provided.

One set of embodiments may include a method performed by a wireless device, comprising: transmitting, to a base station, a Physical Uplink Control Channel (PUCCH) capability report comprising at least one of PUCCH grouping capability information and a PUCCH location capability information, wherein the PUCCH grouping capability information indicates carrier types of bands which are configurable in a same PUCCH group, wherein the bands include at least one normal downlink (DL) band and at least one supplementary downlink (SDL) band, and wherein the PUCCH location capability information indicates carrier types of bands which are configurable to transmit the PUCCH, wherein the bands include at least one normal uplink (UL) band and at least one supplementary uplink (SUL) band.

According to some embodiments, the carrier types for the at least one normal DL band or the at least one normal UL band comprise frequency range (FR) 1 licensed time division duplex (TDD), FR1 unlicensed TDD, FR1 licensed frequency division duplex (FDD), and FR2.

According to some embodiments, the at least one SDL band is indicated by a data field indicating at least one extended carrier type independent of the FR1 licensed TDD, FR1 unlicensed TDD, FR1 licensed FDD and FR2.

According to some embodiments, the at least one extended carrier type comprises SDL.

According to some embodiments, the at least one extended carrier type comprises FR1 SDL and FR2 SDL.

According to some embodiments, the at least one SDL band is determined by the configurable carrier types for the at least one normal DL band indicated by the PUCCH grouping information and a predefined mapping rule which maps the at least one SDL band to the carrier types for the at least one normal DL band.

According to some embodiments, the at least one SDL band is determined in accordance with a carrier type of a normal DL band which the at least one SDL band overlaps among the configurable carrier types for the at least one normal DL band indicated by the PUCCH grouping information.

According to some embodiments, when the SDL band or the SUL band is characterized as a TDD band, all slots are used for communication or some slots are prevented from being used for communication.

According to some embodiments, wherein the at least one SUL band is indicated by a data field indicating at least one extended carrier type independent of the FR1 licensed TDD, FR1 unlicensed TDD, FR1 licensed FDD and FR2.

According to some embodiments, the at least one extended carrier type comprises SUL.

According to some embodiments, the at least one extended carrier type comprises FR1 SUL and FR2 SUL.

According to some embodiments, the at least one SUL band is determined in accordance with a carrier type of a normal UL band with which the at least one SDL band is associated among the configurable carrier types for the at least one normal DL band indicated by the PUCCH grouping information.

According to some embodiments, a duplex mode of the at least one SUL band is determined in accordance with a duplex mode of the normal UL band with which the at least one SDL band is associated, and wherein the PUCCH location capability information is capable of indicating that the wireless device does not support an SUL which has different FR or type of license from that of the normal UL band with which the SDL band is associated.

According to some embodiments, the PUCCH capability report is transmitted per band combination (BC) comprising a first number of bands with a second number of carrier types.

According to some embodiments, wherein the first number of bands is counted by taking the SDL bands and the SUL bands into consideration according to one of the following:

none of SDL and SUL bands is counted;

only SDL bands are counted, but SUL bands are not counted;

only SUL bands are counted, but SDL bands are not counted; or all of SDL and SUL bands are counted.

According to some embodiments, the second number of carrier types is counted by taking the SDL bands and the SUL bands into consideration according to one of the following:

none of SDL and SUL bands is counted;

only SDL bands are counted, but SUL bands are not counted;

only SUL bands are counted, but SDL bands are not counted; or all of SDL and SUL bands are counted;

According to some embodiments, the PUCCH grouping capability information or the PUCCH location capability information indicates the carrier types of bands for a primary PUCCH group and a secondary PUCCH group, respectively, and the carrier types of bands are indicated by using a bitmap including a number of bits included in the PUCCH capability report, the number of bits in the bitmap being determined in accordance with the second number of carrier types contained in the band combination (BC).

According to some embodiments, the carrier types of bands are indicated by using an index into a list of bitmaps independently for the primary PUCCH group and the secondary PUCCH group for each BC.

According to some embodiments, the SUL band is an FDD band.

Another set of embodiments may comprise a processor configured to perform a method according to any or all parts of the preceding embodiments.

Another set of embodiments may include a wireless device, comprising: at least one antenna; at least one radio coupled to the at least one antenna; and a processor as described above and coupled to the at least one radio.

Another set of embodiments may include a computer readable storage medium, having computer program instructions stored thereon, which, when executed by a processor, cause a wireless device to perform a method according to any or all parts of the preceding embodiments.

Another set of embodiments may include a computer program product, comprising computer program instructions stored thereon, which, when executed by a processor, cause a wireless device to perform a method according to any or all parts of the preceding embodiments.

Yet another exemplary embodiment may comprise a method performed by a base station, comprising: receiving, from a wireless device, a Physical Uplink Control Channel (PUCCH) capability report comprising at least one of PUCCH grouping capability information and a PUCCH location capability information, wherein the PUCCH grouping capability information indicates carrier types of bands which are configurable in a same PUCCH group, wherein the bands include at least one normal downlink (DL) band and at least one supplementary downlink (SDL) band, and wherein the PUCCH location capability information indicates carrier types of bands which are configurable to transmit the PUCCH, wherein the bands include at least one normal uplink (UL) band and at least one supplementary uplink (SUL) band.

According to some embodiments, the carrier types for the at least one normal DL band or the at least one normal UL band comprise frequency range (FR) 1 licensed time division duplex (TDD), FR1 unlicensed TDD, FR1 licensed frequency division duplex (FDD), and FR2.

According to some embodiments, the at least one SDL band is indicated by a data field indicating at least one extended carrier type independent of the FR1 licensed TDD, FR1 unlicensed TDD, FR1 licensed FDD and FR2.

According to some embodiments, the at least one extended carrier type comprises SDL.

According to some embodiments, the at least one extended carrier type comprises FR1 SDL and FR2 SDL.

According to some embodiments, the at least one SDL band is determined by the configurable carrier types for the at least one normal DL band indicated by the PUCCH grouping capability information and a predefined mapping rule which maps the at least one SDL band to the carrier types for the at least one normal DL band.

According to some embodiments, the at least one SDL band is determined in accordance with a carrier type of a normal DL band which the at least one SDL band overlaps among the configurable carrier types for the at least one normal DL band indicated by the PUCCH grouping capability information.

According to some embodiments, when the SDL band or the SUL band is characterized as a TDD band, all slots are used for communication or some slots are prevented from being used for communication.

According to some embodiments, the at least one SUL band is indicated by a data field indicating at least one extended carrier type independent of the FR1 licensed TDD, FR1 unlicensed TDD, FR1 licensed FDD and FR2.

According to some embodiments, the at least one extended carrier type comprises SUL.

According to some embodiments, the at least one extended carrier type comprises FR1 SUL and FR2 SUL.

According to some embodiments, the at least one SUL band is determined in accordance with a carrier type of a normal UL band with which the at least one SDL band is associated among the configurable carrier types for the at least one normal DL band indicated by the PUCCH location capability information.

According to some embodiments, a duplex mode of the at least one SUL band is determined in accordance with a duplex mode of the normal UL band with which the at least one SDL band is associated, and wherein the PUCCH location capability information is capable of indicating that the wireless device does not support an SUL which has different FR or type of license from that of the normal UL band with which the SDL band is associated.

According to some embodiments, the PUCCH capability report is transmitted per band combination (BC) comprising a first number of bands with a second number of carrier types.

According to some embodiments, the first number of bands is counted by taking the SDL bands and the SUL bands into consideration according to one of the following:

none of SDL and SUL bands is counted;

only SDL bands are counted, but SUL bands are not counted;

only SUL bands are counted, but SDL bands are not counted; or all of SDL and SUL bands are counted.

According to some embodiments, the second number of carrier types is counted by taking the SDL bands and the SUL bands into consideration according to one of the following:

none of SDL and SUL bands is counted;

only SDL bands are counted, but SUL bands are not counted;

only SUL bands are counted, but SDL bands are not counted; or all of SDL and SUL bands are counted;

According to some embodiments, the PUCCH grouping capability information or the PUCCH location capability information indicates the carrier types of bands for a primary PUCCH group and a secondary PUCCH group, respectively and the carrier types of bands are indicated by using a bitmap including a number of bits included in the PUCCH capability report, the number of bits in the bitmap being determined in accordance with the second number of carrier types contained in the band combination (BC).

According to some embodiments, the carrier types of bands are indicated by using an index into a list of bitmaps independently for the primary PUCCH group and the secondary PUCCH group for each BC.

A yet further exemplary embodiment may comprise a processor configured to perform a method according to any or all parts of the preceding embodiments.

A yet further exemplary embodiment may include a base station, comprising: at least one antenna; at least one radio coupled to the at least one antenna; and a processor according to the processor of the preceding embodiment and coupled to the at least one radio.

A yet further exemplary embodiment may include a computer readable storage medium, having computer program instructions stored thereon, which, when executed by a processor, cause a base station to perform a method a method according to any or all parts of the preceding embodiments.

Still another exemplary embodiment may include an apparatus comprising a processing element configured to cause a wireless device to perform a method according to any or all parts of the preceding embodiments.

A yet further exemplary embodiment may include a computer program product, comprising computer program instructions stored thereon, which, when executed by a processor, cause a base station to perform a method a method according to any or all parts of the preceding embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or BS 102) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless device, comprising:

at least one antenna;

at least one radio coupled to the at least one antenna; and a processor coupled to the at least one radio, wherein the wireless device is configured to:

transmit, to a base station, a Physical Uplink Control Channel (PUCCH) capability report comprising at least one of PUCCH grouping capability information and a PUCCH location capability information, wherein the PUCCH grouping capability information indicates carrier types of bands which are configurable in a same PUCCH group, wherein the bands include at least one normal downlink (DL) band and at least one supplementary downlink (SDL) band, wherein the PUCCH location capability information indicates carrier types of bands which are configurable to transmit the PUCCH, wherein the bands include at least one normal uplink (UL) band and at least one supplementary uplink (SUL) band, wherein the carrier types for the at least one normal DL band or the at least one normal UL band comprise frequency range (FR) 1 licensed time division duplex (TDD), FR1 unlicensed TDD, FR1 licensed frequency division duplex (FDD), and FR2, and wherein the at least one SDL band is indicated by a data field indicating at least one extended carrier type independent of the FR1 licensed TDD, FR1 unlicensed TDD, FR1 licensed FDD and FR2.

2. The wireless device of claim 1, wherein the at least one extended carrier type comprises SDL.

3. The wireless device of claim 1, wherein the at least one extended carrier type comprises FR1 SDL and FR2 SDL.

4. The wireless device of claim 1, wherein the at least one SDL band is determined by the configurable carrier types for the at least one normal DL band indicated by the PUCCH grouping capability information and a predefined mapping rule which maps the at least one SDL band to the carrier types for the at least one normal DL band.

5. The wireless device of claim 1, wherein the at least one SDL band is determined in accordance with a carrier type of a normal DL band which the at least one SDL band overlaps among the configurable carrier types for the at least one normal DL band indicated by the PUCCH grouping capability information.

6. The wireless device of claim 1, wherein the at least one SUL band is indicated by a data field indicating at least one extended carrier type independent of the FR1 licensed TDD, FR1 unlicensed TDD, FR1 licensed FDD and FR2.

7. The wireless device of claim 6, wherein the at least one extended carrier type comprises SUL.

8. The wireless device of claim 6, wherein the at least one extended carrier type comprises FR1 SUL and FR2 SUL.

9. The wireless device of claim 1, wherein the at least one SUL band is determined in accordance with a carrier type of a normal UL band with which the at least one SUL band is associated among the configurable carrier types for the at least one normal UL band indicated by the PUCCH location capability information.

10. The wireless device of claim 9, wherein a duplex mode of the at least one SUL band is determined in accordance with a duplex mode of the normal UL band with which the at least one SUL band is associated, and wherein the PUCCH location capability information is capable of indicating that the wireless device does not support an SUL band which has different FR or type of license from that of the normal UL band with which the SUL band is associated.

11. The wireless device of claim 1, wherein the PUCCH capability report is transmitted per band combination (BC) comprising a first number of bands with a second number of carrier types.

12. The wireless device of claim 11, wherein the first number of bands is counted by not taking the SDL bands and the SUL bands into consideration or taking the SDL bands and the SUL bands into consideration according to one of the following:
   only SDL bands are counted, but SUL bands are not counted;
   only SUL bands are counted, but SDL bands are not counted; or
   all of SDL and SUL bands are counted.

13. The wireless device of claim 12, wherein the second number of carrier types is counted by not taking the SDL bands and the SUL bands into consideration or taking the SDL bands and the SUL bands into consideration according to one of the following:
   only SDL bands are counted, but SUL bands are not counted;
   only SUL bands are counted, but SDL bands are not counted; or
   all of SDL and SUL bands are counted.

14. The wireless device of claim 11, wherein the PUCCH grouping capability information or the PUCCH location capability information indicates the carrier types of bands for a primary PUCCH group and a secondary PUCCH group, respectively, and
   wherein the carrier types of bands are indicated by using a bitmap including a number of bits included in the PUCCH capability report, the number of bits in the bitmap being determined in accordance with the second number of carrier types contained in the band combination (BC).

15. The wireless device of claim 14, wherein the carrier types of bands are indicated by using an index into a list of bitmaps independently for the primary PUCCH group and the secondary PUCCH group for each BC.

16. The method of claim 1, wherein the SUL band is a FDD band.

17. A processor configured to:
   transmit, to a base station, a Physical Uplink Control Channel (PUCCH) capability report comprising at least one of PUCCH grouping capability information and a PUCCH location capability information,
   wherein the PUCCH grouping capability information indicates carrier types of bands which are configurable in a same PUCCH group, wherein the bands include at least one normal downlink (DL) band and at least one supplementary downlink (SDL) band,
   wherein the PUCCH location capability information indicates carrier types of bands which are configurable to transmit the PUCCH, wherein the bands include at least one normal uplink (UL) band and at least one supplementary uplink (SUL) band,
   wherein the carrier types for the at least one normal DL band or the at least one normal UL band comprise frequency range (FR) 1 licensed time division duplex (TDD), FR1 unlicensed TDD, FR1 licensed frequency division duplex (FDD), and FR2, and
   wherein the at least one SDL band is indicated by a data field indicating at least one extended carrier type independent of the FR1 licensed TDD, FR1 unlicensed TDD, FR1 licensed FDD and FR2.

18. A base station, comprising:
   at least one antenna;
   at least one radio coupled to the at least one antenna; and
   a processor coupled to the at least one radio,
   wherein the base station is configured to:
   receive, from a wireless device, a Physical Uplink Control Channel (PUCCH) capability report comprising at least one of PUCCH grouping capability information and a PUCCH location capability information,
   wherein the PUCCH grouping capability information indicates carrier types of bands which are configurable in a same PUCCH group, wherein the bands include at least one normal downlink (DL) band and at least one supplementary downlink (SDL) band,
   wherein the PUCCH location capability information indicates carrier types of bands which are configurable to transmit the PUCCH, wherein the bands include at least one normal uplink (UL) band and at least one supplementary uplink (SUL) band,
   wherein the carrier types for the at least one normal DL band or the at least one normal UL band comprise frequency range (FR) 1 licensed time division duplex (TDD), FR1 unlicensed TDD, FR1 licensed frequency division duplex (FDD), and FR2, and
   wherein the at least one SDL band is indicated by a data field indicating at least one extended carrier type independent of the FR1 licensed TDD, FR1 unlicensed TDD, FR1 licensed FDD and FR2.

* * * * *